June 17, 1969  T. M. RUNGE  3,450,130
HYPERVENTILATION DETECTING AND WARNING METHOD
Filed March 22, 1965  Sheet 1 of 2

INVENTOR.
THOMAS M. RUNGE

BY B.P. Fishburn, Jr.

ATTORNEY.

June 17, 1969     T. M. RUNGE     3,450,130

HYPERVENTILATION DETECTING AND WARNING METHOD

Filed March 22, 1965

INVENTOR.
THOMAS M. RUNGE

BY *B. P. Fishburne, Jr.*

ATTORNEY.

United States Patent Office 3,450,130
Patented June 17, 1969

3,450,130
HYPERVENTILATION DETECTING AND WARNING METHOD
Thomas M. Runge, 2501 Galewood Place,
Austin, Tex. 78703
Filed Mar. 22, 1965, Ser. No. 441,467
Int. Cl. A61b 5/04
U.S. Cl. 128—2.1
2 Claims

ABSTRACT OF THE DISCLOSURE

A method for detecting the presence of hyperventilation syndrome involving the connection of a pain-inducing element to a sensitive part of the body and adjusting the intensity of a pain-producing stimulus through the element to a point just below the threshold of pain and then allowing the victim to breathe and observing the onset of pain if the syndrome is present.

---

This invention relates to a method of detecting the presence of hyperventilation syndrome and of warning of the existence of the condition in an individual.

The noxious effects of hyperventilation have been well established. The syndrome consists of a number of symptoms including increased neural irritability, faintness, which may progress to syncope, slight impairment of vision, tetany, electrocardiographic abnormalities, lowered threshold for cardiac arrhythmias and for convulsions and hyperreflexia. Most important, under other than controlled or laboratory environment, the syndrome is often associated with bouts of severe anxiety, so-called "panic reaction" which probably results from a combination of carbon dioxide deficit and adrenalin excess. A pattern of chronic mild hyperventilation is recognized also in which a few deep breaths are enough to produce tetanic symptoms.

While the syndrome of hyperventilation is thus understood and its potential lethal effects known, as in pilots, steeplejacks, soldiers, etc., the control of the acute syndrome in particular is made difficult because of its mode of onset, taking the victim by surprise when he is least prepared to cope with the symptoms, that is, when he is preoccupied with some tense, exacting or dangerous task. The presence of hyperventilation in pilots and its role in aircraft accidents has been recognized in medical literature.

For the above reasons, an efficient and practical hyperventilation detecting and warning method is highly desirable and will be quite useful, and the provision of such a method constitutes the main objective of this invention. The invention method is founded upon the fact that hyperventilation is known to increase neural irritability and to lower the pain threshold of the victim. That is to say, the victim of hyperventilation is more susceptible to pain and senses pain more readily and under a lesser degree of pain-inducing stimulus than an individual free of the syndrome.

It is believed that the invention will also find valuable use in connection with the testing of individuals who may be under the influence of alcohol or narcotics and certain sedatives, all of which substances tend to raise the pain threshold in the subject as contrasted to lowering it in the case of hyperventilation. The invention should find valuable utility in both of these areas.

An additional usage of the invention resides in objectively evaluating the stoicism of phlegmatic nature of an individual as opposed to decreased pain threshold in emotionally labile individuals. In this way, the invention may be used to screen individuals for various types of work and to exclude undesirables. It is known that stoics are best suited in some situations, whereas emotionally labile persons may have unusual aptitude in other lines of work, each type having his assets and drawbacks.

The purposes and utility of the invention may be summarized as (1) to detect and warn the user of the presence of hyperventilation; (2) to determine the relative susceptibility to hyperventilation of one person as compared with another, i.e. to screen hyperventilators; (3) to detect the presence of certain other factors which may produce a lowered pain threshold, i.e. neurasthenia, and sensory deprivation; and (4) to detect the presence of certain factors which may raise the pain threshold, i.e. alcohol, sedatives, narcotics, drowsiness and stoicism.

Another important object of the invention is to provide a readily adjustable apparatus for the practice of the method which will produce automatically a recognizable painful stimulus as hyperventilation occurs in the individual using the invention. The invention may be used, for example, by an instructor or by a student (pilot or the like) to test for hyperventilation periodically, as under stressful conditions. The method may be used to measure a person's hyperventilation threshold from day-to-day and on a comparative basis. It can be used to grade hyperventilation susceptibility in one person as compared to another.

A further object of the invention is to provide an apparatus for practicing the method of the mentioned character which can be made lightweight, compact and portable, or which may be permanently installed as a part of the instrumentation of an aircraft or the like.

Other objects and advantages of the invention will become apparent during the course of the following detailed description.

In the accompanying drawings forming a part of this application and in which like numerals are employed to designate like parts throughout the same, FIGURE 1 is a perspective view of a simplified instrument embodying the invention in its most elementary form;

Figure 1:
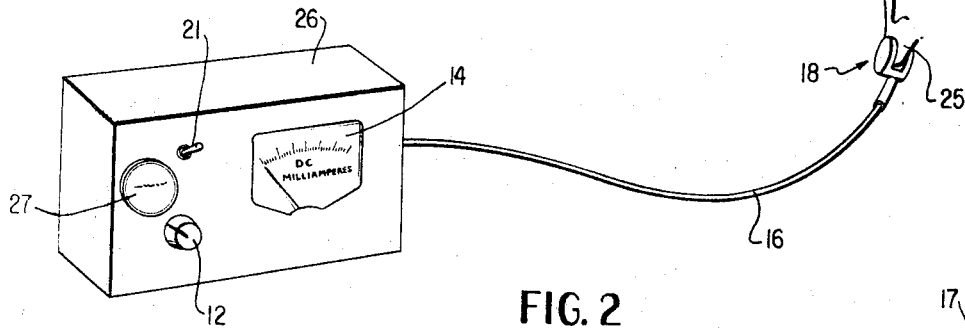
Figure 2:
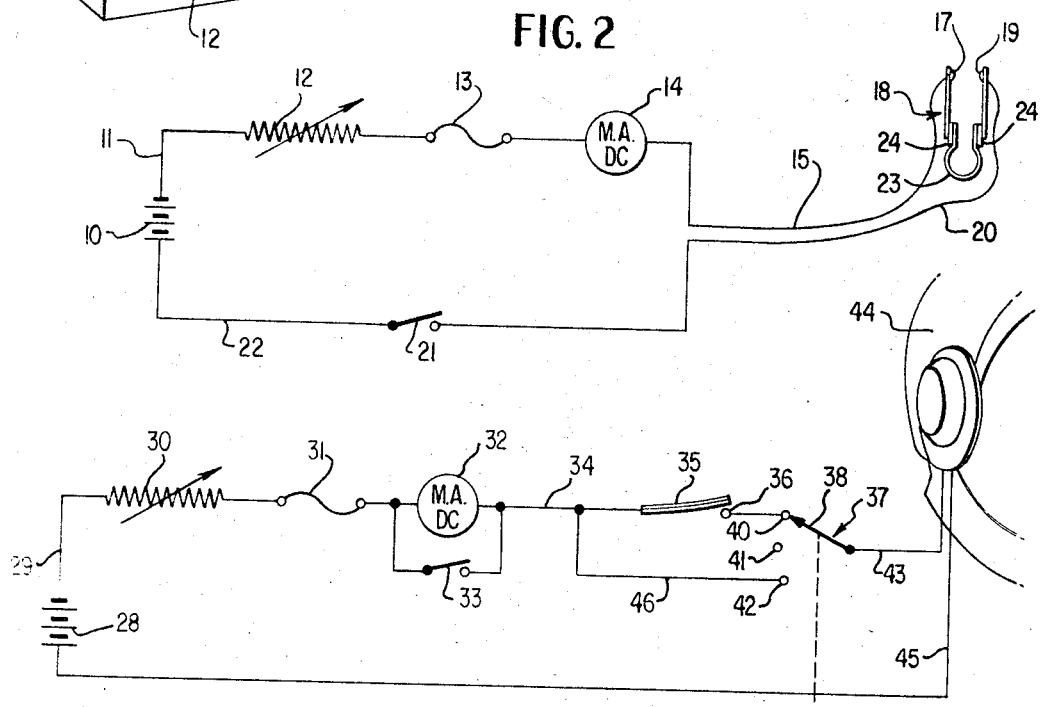
FIGURE 2 is a diagrammatic view of the electrical circuit employed in the FIGURE 1 instrument.

In the drawings wherein for the purpose of illustration are shown preferred embodiments of the invention, attention is directed first to FIGURES 1 and 2, wherein the numeral 10 designates a source of direct current such as a 45-volt battery or approximate equivalent. The battery is connected by wire 11 with any suitable type of manually operable variable resistance 12, in turn connected in series with a fuse 13, also connected in series with a direct current milliammeter 14 or like indicating instrument. The milliammeter is in turn connected in series by a wire 15 forming one element of a cable 16 with one electrical terminal 17 or electrode of an ear clip 18. The ear clip comprises a second electrode 19 connected with another wire 20, leading to and connected with any suitable on and off switch 21 connected with another wire 22 leading back to the battery 10.

The electrodes 17 and 19 may be spring elements or blades carried by a generally U-shaped clip 23 and insulated from the latter by insulating strips 24. By virtue of this construction, when the device 18 is applied to the lobe 25 of the ear or some like sensitive body member, the ear lobe is placed directly in the series circuit of the instrument shown in FIGURE 2 and becomes a part of this circuit.

The cable 16 composed of the wires 15 and 20 may be of any convenient length and suitably insulated. The other components of the instrument shown diagrammatically in FIGURE 2 are housed in a suitable box 26 as indicated in FIGURE 1. The front panel of the box 26 is preferably, although not necessarily, provided with a panel 27 of frosted glass or the like, whereby the user may write and record current readings to assure reliable comparisons and eliminate the necessity for relying on memory when using the instrument.

The use or operation of the invention for the practice of the method is very simple and is the following. The ear piece or clip 18 is applied to the ear lobe much in the manner of an ordinary resilient-type earring. If preferred, a screw-type adjustment may be employed on the ear piece as well as other conventional mechanical arrangements. With the ear piece in place, the switch 21 is closed and the circuit is completed through the ear lobe. The resistance 12 is adjusted to a point where the reading on the meter 14 will be just slightly below that reading at which pain will be experienced at the ear lobe. This sub-painful meter reading is then preferably recorded on the panel 27. The test subject continues to breathe in what he believes to be the normal manner and if such is the case, there will be no experience of pain at the ear lobe. If hyperventilation exists to any appreciable degree in the subject, after a relatively short period of breathing, pain will begin to be experienced at the ear lobe due to the aforementioned fact that the pain threshold is decreased as hyperventilation occurs. At this time, the resistance 12 may again be adjusted to such a degree that the sensation of pain is eliminated. This will produce a second and decreased reading on the meter 14 for comparison with other readings for the same subject and/or for comparison with the readings of other subjects using the invention. The subject having thus been warned by the instrument of the presence of hyperventilation can take corrective measures which amounts to no more than being conscious of his breathing process and controlling the rate of breathing and the depth of breathing. That is to say, hyperventilation is brought on by a person who, for example, is suffering from anxiety and who therefore tends to sigh and breathe abnormally deeply and more rapidly than normal. The condition can be corrected by simply controlling breathing and being aware of what the condition is. The invention instrument, therefore, has as its main function to warn the subject of the presence of the condition, hyperventilation, so that corrective measures may be taken.

If desired, the meter 14 could be omitted entirely from the instrument in FIGURES 1 and 2 and the instrument would then involve essentially the ear piece, source of current and variable resistance. These basic elements would still impart to the instrument the necessary utility for warning the subject of the presence or onset of hyperventilation. However, the instrument without the meter or like indicating means would lose its utility for indicating comparisons as discussed above.

Figure 3:
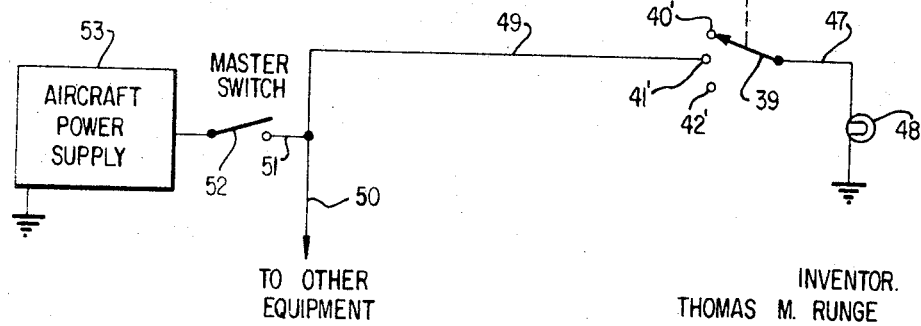
FIGURE 3 is a diagrammatic view of a modified form of the invention as where the invention is employed on an airplane.

FIGURE 3 of the drawings discloses a modification where the invention apparatus may be incorporated in or used in conjunction with an aircraft pilot's accessory equipment and/or the instrumentation equipment of the aircraft. In FIGURE 3, the numeral 28 designates a battery identical or similar to the battery 10 and connected in series through a wire 29 with a variable resistance 30, in turn electrically connected in series with a fuse 31 and milliammeter 32 or the like. A switch 33 is connected in parallel with the meter 32 so that the latter may be shunted out of the circuit at any time, if desired. The milliammeter 32 is connected in series by a wire 34 with a thermally-responsive current chopper 35, preferably in the form of a bimetal contact element which has the ability to make electrical contact with a terminal 36 upon cooling and which separates from this terminal to interrupt the circuit upon heating due to the flow of current therethrough. The chopper device 35 is illustrated in FIGURE 3 as being in the heated current-interrupting position. By the alternate cyclic heating and cooling of the chopper 35, the flow of current in the circuit is periodically interrupted in the desired manner. In substance, the current will flow in the circuit in pulses of the desired and predetermined duration, depending upon the operating characteristics of the thermally-responsive chopper. Any preferred conventional type of thermally-responsive chopper may be employed, and for that matter, the circuit may employ various other known forms of choppers or current pulsers. The circuit includes a ganged switch 37 whose contact arms 38 and 39 move in unison with respect to fixed contacts 40, 41 and 42 and 40', 41', and 42'. The contact arm 38 is connected through a wire 43 with the ear piece or clip which is preferably incorporated within the structure of the pilot's head gear 44. The ear clip may be identical with the assembly shown at 18 in FIGURES 1 and 2 and the details of the clip have been omitted in FIGURE 3 because the structure has already been described. A return wire 45 from the ear piece or clip leads back to the battery 28 to complete a circuit.

A wire 46 leading from the switch contact 42 is electrically connected with the wire 34 ahead of the chopper device 35 so that the latter may be shorted out when desired by moving the contact arm 38 into engagement with the contact 42. When this occurs, a continuous or uninterrupted current flows to the ear lobe of the subject rather than a periodic current pulse. This arrangement renders the invention somewhat more flexible in its utility than the prior simplified embodiment. Some subjects may be more responsive to a pulsing-type current whereas others may prefer and respond to a continuous flow of current at the ear lobe. In connection with the current pulses, it is preferred that the chopper means have a sufficiently slow cycle of operation that the milliammeter will be able to stabilize itself to make possible an accurate reading upon each closing of the circuit.

The movable contact arm 39 is connected with a grounded wire 47 having an indicator or warning light bulb 48 therein. The central contact 41' is connected with a wire 49 leading to other aircraft electrical equipment at 50 and having a branch wire 51 connected thereto, the wire 51 containing a master switch 52, and leading to the aircraft main power supply 53.

When the ganged switch contact arm 38 is engaging the terminal 40, the contact arm 39 is on the blank contact 40' and the warning light 48 is disconnected from the electrical circuit. The subject observing the light to be out knows that the warning instrument is in operation and he is now receiving at the ear lobe pulses of current caused by the operation of the chopper 35 in the series circuit which includes the ear lobe. If the switch contact arm 38 is shifted to the contact 42, the subject will experience an uninterrupted and continuous flow of current at the ear lobe because the thermally-responsive chopper 35 will now be shorted out of the circuit. The other switch arm 39 will now be engaging the terminal 42' and the warning light 48 will again be extinguished so that the subject will know that the system is operating. When the contact arm 38 is engaging the central blank terminal 41, however, the electrical circuit through the ear lobe is interrupted and the hyperventilation instrument is not operating. However, at this time, the switch contact arm 39 will engage the active terminal 41' and current will flow to the indicator light 48 alerting the subject visually to the fact that the system is inactive.

Concerning the general mode of operation of the embodiment in FIGURE 3 for detecting and warning of the presence or onset of hyperventilation, the invention is the same as described in connection with the first embodiment. That is to say, the user couples the ear piece to the ear lobe, closes the circuit in either of the two described manners and adjusts the variable resistance to a point just below the painful level and then proceeds to test his breathing for the presence or absence of hyperventilation. This characteristic operation is common to all forms of the invention herein and need not again be described.

Figure 4:
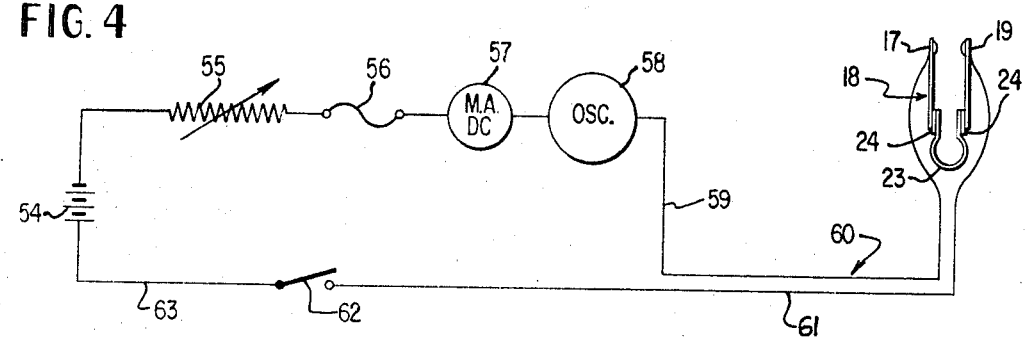
FIGURE 4 is a diagrammatic view of another modification.

FIGURE 4 illustrates a further modified form of the invention, wherein a battery 54 is connected in series with a variable resistance 55, fuse 56, milliammeter 57 and oscillator 58, as shown. The oscillator may be any one of a variety of conventional types and serves simply to create a pulsating current of a preferably very low frequency and maintain that frequency in the circuit of which the ear lobe of the subject is a part, as previously explained. The oscillator is connected with a wire 59 incorporated within a cable 60, similar to the cable 16, leading to the previously-described ear piece or clip 18. The description of the ear clip need not be repeated for a proper understanding of FIGURE 4. The return wire 61 from the ear clip leads to an on and off switch 62, connected with a wire 63 leading back to the battery 54 to complete the circuit.

The mode of use and the purposes of the invention in FIGURE 4 are the same as described in connection with the prior embodiments thereof.

Figure 5:
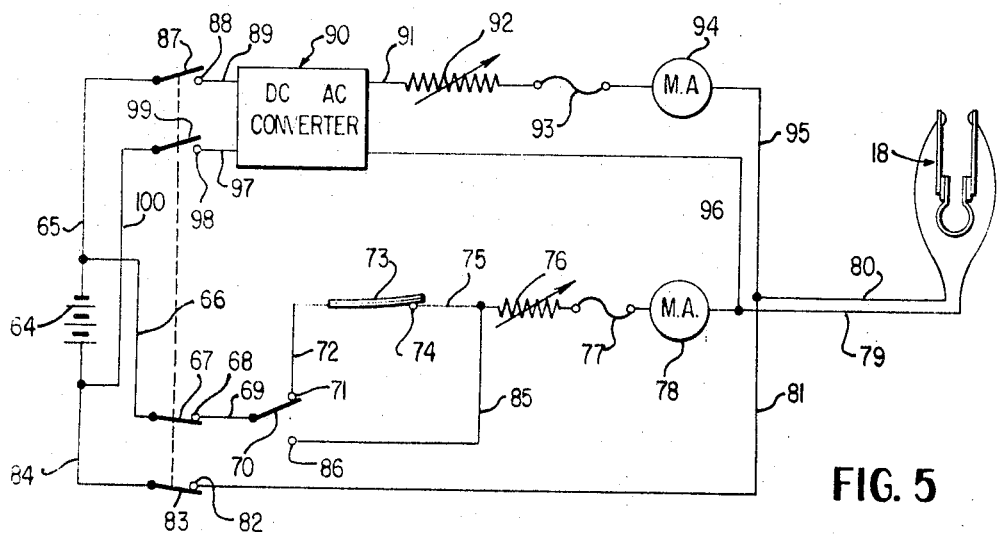
FIGURE 5 is a diagrammatic view of a further modified and refined form of the invention.

FIGURE 5 shows a further modification of the invention rendering the apparatus somewhat more versatile. In this figure, a battery 64 is connected with a wire 65, in turn connected with a wire 66 having a ganged switch contact arm 67 connected therein, engageable with a contact 68. A wire 69 leads to a single pole double-throw switch 70, one terminal 71 of which is connected with a wire 72 having a thermally-operated bimetal chopper 73 therein which may be identical to the chopper 35. The chopper terminal 74 is connected with a wire 75 leading to a variable resistance 76, connected in series with a fuse 77 and milliammeter 78, in turn connected with a wire 79 leading to one terminal of the previously-described ear clip 18. The other terminal of the ear clip is connected with a wire 80 constituting a part of a flexible cable, leading to and connected with a wire 81 extending to a terminal 82 of the ganged switch which has another contact arm 83, connected with a wire 84 leading back to the battery 64. Another wire 85 connected with the wire 75 between the chopper device and variable resistance is connected with the second terminal 86 of switch 70, whereby the chopper device 73 may be shunted when it is desired to apply a continuous and uninterrupted type of current to the ear lobe instead of a pulsing current.

With continued reference to FIGURE 5, the aforementioned wire 65 leads to and is connected with another switch contact arm 87 of the ganged switch, having a terminal 88 connected by a wire 89 with one input terminal of a suitable direct to alternating current converter 90 which may be conventional. A wire 91 leads from the converter to supply alternating current at preferably a very low frequency through a series connected variable resistance 92, fuse 93 and milliammeter 94 to a wire 95, in turn connected with the cable wire 80 leading to the ear piece 18. A return wire 96 is connected with the cable wire 79 as shown, and leads back to the converter 90 which in turn is connected with a wire 97, leading to a switch contact 98 for another contact arm 99 of the ganged switch shown in FIGURE 5. The contact arm 99 is connected with a wire 100 leading back to the wire 84 and battery 64.

When the circuit in FIGURE 5 is arranged as illustrated, the ganged switch has its contacts 68 and 82 closed and its contacts 88 and 98 open. Therefore, direct current will flow from the battery 64 and through wires 66, 69 and 72 to the chopper device 73 whose operation responsive to heating and cooling will produce a pulsating current in the wire 75 and through the resistance 76, milliammeter 78, wire 79, ear piece 18 and through the wires 80, 81 and 84 back to the battery. If a continuous or non-pulsing current flow to the ear is preferred, the switch 70 is shifted over to the contact 86 thereby shorting out the current chopper 73. At this time, the converter 90 and associated elements are not in the circuit because the ganged switch contacts 88 and 98 are open, as shown.

However, when the ganged switch is shifted to the alternate position, not shown, the contacts 88 and 98 will be engaged by the arms 87 and 98 to complete a circuit with the ear lobe through the DC to AC converter. Simultaneously, the contacts 68 and 82 will be disengaged by the switch arms 67 and 83 and the circuit through the chopper 73 and associated elements will be interrupted. When this condition prevails, current will flow from the battery 64 and through wires 65 and 89 to the direct current input side of the converter. Preferably low frequency alternating current will flow from the output side of the converter through the wire 91, variable resistance, fuse, milliammeter and wire 95 to the wire 80 and ear clip. From the ear clip 18, current will flow back through the wires 79 and 96 to the converter and from the converter through wires 97 and 100 back to the wire 84 and battery, thus completing another circuit.

By virtue of this arrangement, the user of the device has a choice of low frequency alternating current from the converter 90 or continuous or pulsating direct current through the previously-described circuit including the elements 73, 76 and 78. In either event, the variable resistances are adjusted by the subject in the described manner and comparison readings are obtained from the meters, etc. The fundamental use or operation of the invention remains unaltered in the more elaborate version of the system shown in FIGURE 5.

Figure 6:
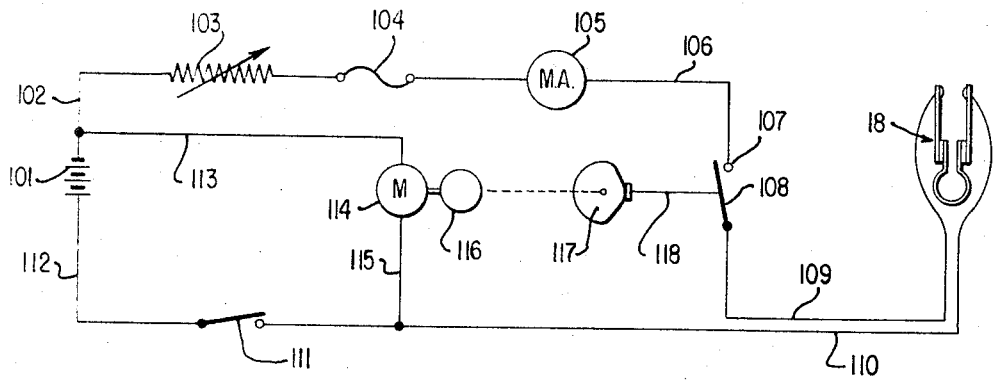
FIGURE 6 is a diagrammatic view of a still further embodiment of the invention.

FIGURE 6 shows another modification of the invention wherein a battery 101 is connected with a wire 102 leading to variable resistance 103, fuse 104 and milliammeter 105 connected in series. Meter 105 is connected with a wire 106 leading to terminal 107 of a switch 108, having its movable contact arm electrically connected with a wire 109 leading to the previously-described ear piece or clip 18. A return wire 110 from the ear piece leads to and is connected with an on and off switch 111, connected with a wire 112 leading back to the battery 101.

A wire 113 connected in the wire 102 supplies the full power of the battery to a small motor 114 which is connected by another wire 115 with the wire 110, thus completing a circuit through the battery and motor. The motor is mechanically connected with and drives a conventional speed reducer 116 shown diagrammatically in the drawings, in turn driving a cam 117 which engages and operates a cam follower 118 on switch contact arm 108. When the motor 114 is in operation, which occurs when the switch 111 is closed, the cam 117 will periodically open and close the switch 107–108 to periodically interrupt the flow of direct current to the ear lobe set between the terminals of the ear piece 18. With this independently powered mechanical drive for the switch 107–108, regularly timed current impulses of almost any desired duration may be created through the ear piece. Variations in the timing of the impulses will of course depend upon the particular configuration of the cam 117. The illustrated cam in FIGURE 6 maintains the switch closed for establishing current flow through the ear lobe a considerably longer period of time than that during which the switch is open by the low part of the cam as presently illustrated in the drawings. In some cases, it might be desirable for the low part of the cam to be designed to keep the switch opened for a relatively greater period. This factor is a variable in the invention and constitutes one of the virtues of the arrangement shown in FIGURE 6 whereby the operation can be rendered quite flexible.

The use of the method for detecting and warning with relation to hyperventilation and other mentioned factors remains essentially the same as previously described.

It might be mentioned that where the method is employed in connection with suspected alcohol and narcotics users and the like, an attempt might be made by the suspect to escape the incriminating indications by falsifying to the operator the point at which the subject contends that he or she begins to experience pain. However, this type of fraud or falsification can be guarded against by keeping the milliammeter concealed from the suspect during the test and repeating the test several times. It will be impossible for a suspect to indicate falsely the onset of pain at the same time in each case and there will invariably be a different meter reading corresponding to each such attempt to falsify the matter.

It may also be mentioned that one reason for selecting the ear lobe as that part of the anatomy to which the electrode structure is attached is because there is very little tendency for the ear lobe to sweat, thus assuring a dry electrical connection and more reliable results.

Regarding all of the embodiments of FIGURES 3 through 6, the basic aim is to provide various means for periodically interrupting the test current flowing to the ear lobe. The purpose of this is to avoid possible decreasing pain sensitivity which might result from constant, continuous flow.

It is to be understood that the forms of the invention herewith shown and described are to be taken as preferred examples of the same, and that various changes in the shape, size and arrangement of parts may be resorted to, without departing from the spirit of the invention or scope of the subjoined claims.

The invention having thus been described, what is claimed is:

1. A hyperventilation detecting and warning method comprising the steps of attaching an electrode to a sensitive part of the body of a test subject, applying a pulsating current to the electrode and adjusting the intensity of the current until the test subject feels pain at said sensitive part of the body, decreasing the intensity of the current to a degree where the pain at the sensitive part of the body is eliminated and measuring the value of the decreased intensity current, allowing the test subject to breathe and hyperventilate for an extended period of time until the test subject again feels pain at the sensitive part of the body having the electrode attached thereto, again decreasing the intensity of the pulsating current applied to the electrode to a degree where the pain at the sensitive part of the body is eliminated, and then measuring the value of the decreased intensity current for comparison with the before-measured current value or for comparison with a standard.

2. A hyperventilation detecting and warning method comprising attaching a pain-inducing electrode to the ear lobe of a test subject, applying current to the electrode and adjusting a resistance means through which the current passes to increase the intensity of the current sufficiently for the test subject to feel pain at the ear lobe, again adjusting the resistance means to decrease the intensity of current sufficiently to eliminate the pain at the ear lobe and measuring the value of the decreased intensity current with a meter means, allowing the test subject to hyperventilate until the subject again feels pain at the ear lobe having the electrode attached thereto, again adjusting the resistance means and decreasing the intensity of the current sufficiently to eliminate the pain at the ear lobe, and again measuring the value of the decreased intensity current with the meter means so that the measured values may be recorded for comparison with standards or with corresponding current values for other test subjects.

References Cited

UNITED STATES PATENTS

| | | | |
|---|---|---|---|
| 1,242,778 | 10/1917 | Darling | 128—2.1 |
| 1,548,184 | 8/1925 | Cameron | 128—423 |
| 2,200,321 | 5/1940 | Angell | 128—2.1 |
| 2,204,295 | 6/1940 | Brockman | 128—2.1 |
| 2,949,107 | 8/1960 | Ziegler | 128—2.1 |

WILLIAM E. KAMM, *Primary Examiner.*